(12) United States Patent
Fitzpatrick

(10) Patent No.: US 9,759,379 B2
(45) Date of Patent: Sep. 12, 2017

(54) GAS STORAGE STRUCTURE AND METHOD OF MANUFACTURE

(71) Applicant: SEA NG CORPORATION, Calgary (CA)

(72) Inventor: John Fitzpatrick, Calgary (CA)

(73) Assignee: SEA NG CORPORATION, Calgary (CA)

( * ) Notice: Subject to any disclaimer, the term of this patent is extended or adjusted under 35 U.S.C. 154(b) by 83 days.

(21) Appl. No.: 14/713,637

(22) Filed: May 15, 2015

(65) Prior Publication Data

US 2015/0330569 A1    Nov. 19, 2015

Related U.S. Application Data

(60) Provisional application No. 61/993,771, filed on May 15, 2014.

(51) Int. Cl.
*F17C 1/00* (2006.01)
*F17C 13/00* (2006.01)
(Continued)

(52) U.S. Cl.
CPC .............. *F17C 1/02* (2013.01); *B23K 31/02* (2013.01); *F17C 1/00* (2013.01); *F17C 1/14* (2013.01);
(Continued)

(58) Field of Classification Search
CPC ...... F17C 1/02; F17C 1/00; F17C 1/14; F17C 13/002; F17C 13/06; F17C 2201/0123; F17C 2201/052; F17C 2201/054; F17C 2221/033; F17C 2209/221; F17C 2270/0105; F17C 2201/0138;
(Continued)

(56) References Cited

U.S. PATENT DOCUMENTS 2,844,271 A * 7/1958 Shelton .................. B65D 90/02
126/361.1
5,803,005 A   9/1998 Stenning et al.
(Continued)

FOREIGN PATENT DOCUMENTS

CA    2283008    9/1999
CA    2283007    3/2001
(Continued)

OTHER PUBLICATIONS

Lucy Hine, CNG Players Gearing Up for Take Off, Oct. 2, 2009, p. 32-33, Trade Winds, Trade Winds Business Report: LNG, London.

*Primary Examiner* — J. Gregory Pickett
*Assistant Examiner* — Niki M Eloshway
(74) *Attorney, Agent, or Firm* — Bennett Jones LLP

(57) ABSTRACT

A gas storage structure includes: a container and a continuous coiled pipe supported by the container, the continuous coiled pipe including a major portion formed of thin walled pipe and a thick walled pipe defining an end of the continuous coiled pipe, the thick walled pipe having a wall thickness thicker than the thin walled pipe, the thick walled pipe being welded at a welded joint to the major portion to place an inner diameter of the thick walled pipe into communication with an inner diameter of the major portion and the thick walled pipe being connected to the container, while the major portion is free of any rigid, such as welded, connections to the container.

19 Claims, 9 Drawing Sheets

(51) Int. Cl.
*F17C 1/02* (2006.01)
*F17C 13/06* (2006.01)
*B23K 31/02* (2006.01)
*F17C 1/14* (2006.01)

(52) U.S. Cl.
CPC ............ *F17C 13/002* (2013.01); *F17C 13/06* (2013.01); *F17C 2201/0123* (2013.01); *F17C 2201/0138* (2013.01); *F17C 2201/052* (2013.01); *F17C 2201/054* (2013.01); *F17C 2203/0617* (2013.01); *F17C 2203/0639* (2013.01); *F17C 2209/221* (2013.01); *F17C 2221/033* (2013.01); *F17C 2223/0123* (2013.01); *F17C 2223/036* (2013.01); *F17C 2270/0105* (2013.01); *Y10T 29/49909* (2015.01)

(58) Field of Classification Search
CPC ...... F17C 2203/0617; F17C 2203/0639; F17C 2223/0123; F17C 2223/036; B23K 31/02; Y10T 29/49909
USPC .............................................. 220/560.04, 678
See application file for complete search history.

(56) References Cited

U.S. PATENT DOCUMENTS

| | | |
|---|---|---|
| 5,839,383 A | 11/1998 | Stenning et al. |
| 6,003,460 A | 12/1999 | Stenning et al. |
| 6,240,868 B1 | 6/2001 | Fitzpatrick et al. |
| 6,308,399 B1* | 10/2001 | Zhou ................ C04B 35/45 29/599 |
| 2001/0004902 A1* | 6/2001 | Garceau ................ F17C 1/00 137/264 |
| 2004/0216656 A1* | 11/2004 | Fitzpatrick .............. B63B 25/14 114/74 A |
| 2007/0075085 A1* | 4/2007 | Arnold ...................... F17C 1/00 220/560.04 |
| 2011/0049879 A1* | 3/2011 | Fitzpatrick .......... F16L 13/0236 285/420 |
| 2012/0138153 A1 | 6/2012 | Fitzpatrick |
| 2013/0153092 A1* | 6/2013 | Kasuya ..................... B23K 9/02 148/524 |
| 2013/0299503 A1* | 11/2013 | Griffith ................... F17C 1/005 220/581 |
| 2015/0323117 A1* | 11/2015 | Martin ...................... C22C 19/03 220/233 |
| 2015/0362211 A1* | 12/2015 | Jacques ..................... F24H 1/43 122/18.4 |

FOREIGN PATENT DOCUMENTS

| | | |
|---|---|---|
| CA | 2341995 | 9/2002 |
| WO | 9716678 | 5/1997 |
| WO | 9814362 | 4/1998 |
| WO | 2074616 | 9/2002 |

\* cited by examiner

GAS STORAGE STRUCTURE AND METHOD OF MANUFACTURE

FIELD OF THE INVENTION

The invention relates to gas storage structures and methods for their manufacture, particularly for the storage and transport of compressed natural gas.

BACKGROUND OF THE INVENTION

Gases such as industrial gases and fuels must sometimes be transported from a production site to a site for use.

Natural gas must often be transported from a production site to a consumption site. There are known methods of transporting natural gas, such as across bodies of water including for example, through pipelines, ship transport as liquefied natural gas (LNG) and ship transport as compressed (non-liquefied) natural gas (CNG).

Transport costs are always a factor. However, costs must particularly be considered in situations where the gas volumes produced at the production site are small. This is true of natural gas, where some formations produce only small quantities.

The present assignee has offered gas transport structures, such as that described in U.S. Pat. No. 5,839,383, but improvements have been sought.

SUMMARY OF THE INVENTION

In accordance with an aspect of the present invention, there is provided a gas storage structure comprising: a container; and a continuous coiled pipe supported by the container, the continuous coiled pipe including: a first end, an opposite end and an intermediate length of pipe between the first end and the opposite end, and wherein, the first end is formed of thick walled pipe, the thick walled pipe having a wall thickness thicker than the intermediate length of pipe, the thick walled pipe being welded to the container; the opposite end is formed of a second thick walled pipe, the second thick walled pipe having a wall thickness thicker than the intermediate length of pipe, the second thick walled pipe being welded at a welded connection to the container; and the intermediate length of pipe is free of any rigid connection to the container, such that the intermediate length of pipe is free to expand and contract due to changes in internal pressure and temperature.

In accordance with another aspect of the present invention, there is provided a method for manufacturing a gas storage structure, the method comprising: welding a thick walled end of a continuous pipe adjacent a central core of a reel-shaped container; wrapping the thick walled end and an intermediate length of the continuous pipe around the central core to arrange the continuous pipe in plural layers of plural wraps; and welding a thick walled terminal end of the continuous pipe to the container, wherein the intermediate length has a wall thickness thinner than a wall thickness of both the thick walled end and the thick walled terminal end and the intermediate length is free of any rigid connection to the container to thereby enable the intermediate length to expand and contract due to changes in internal pressure and temperature.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein.

DETAILED DESCRIPTION OF VARIOUS EMBODIMENTS

Figure 1:
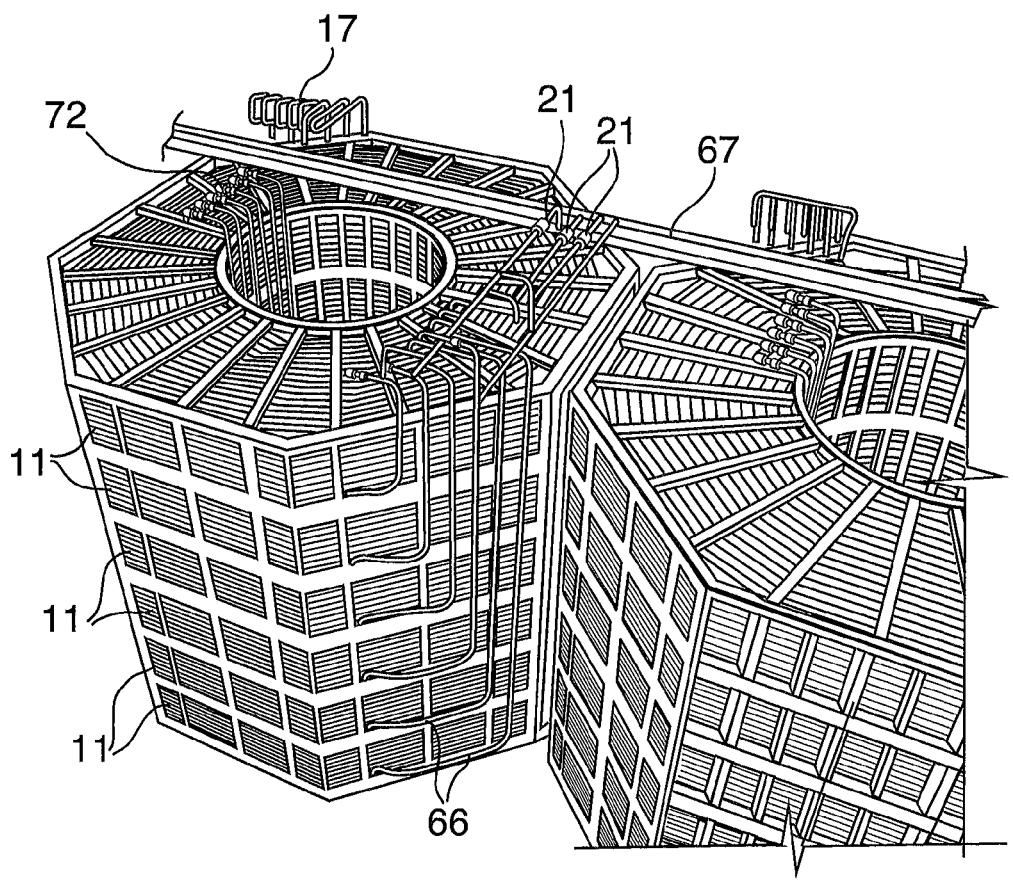
FIG. 1 shows an exemplary coiled continuous pipe gas storage structure according to the invention adapted for the transportation of gas by ship.

The description that follows and the embodiments described therein, are provided by way of illustration of an example, or examples, of particular embodiments of the principles of various aspects of the present invention. These examples are provided for the purposes of explanation, and not of limitation, of those principles and of the invention in its various aspects. In the description, similar parts are marked throughout the specification and the drawings with the same respective reference numerals. The drawings are not necessarily to scale and in some instances proportions may have been exaggerated in order more clearly to depict certain features.

A gas storage structure has been invented. The gas storage structure may be employed to transport gas and in such a case may be installed on a carrier.

A gas storage structure, particularly adapted for transportation of large quantities of compressed gas on board a ship, includes a large storage volume provided by coils of substantially continuous pipe. The use of long lengths of continuous pipe for gas storage leads to a significantly reduced cost as less interconnecting equipment is required between gas storage structures.

There is provided, in accordance with the present invention, a gas storage structure formed of a continuous pipe. The continuous pipe is preferably packed or coiled into a container. In one aspect of the invention, the continuous pipe is wound in plural layers, each layer having plural loops. The continuous pipe, however, may be distributed within a container in a variety of configurations. The container for the coiled pipe may serve several functions. First, the container may act as a carousel for winding the pipe. Second, the container may serve as a means for lifting the pipe. Third, the container may allow the atmosphere surrounding the continuous pipe to be controlled.

When structures, each including a container containing a continuous pipe, are stacked upon each other the weight of upper structures may be borne by the walls of lower containers. This prevents the lower layers of pipe from having to withstand the crushing forces from the weight of the structures above.

A loop of pipe is defined herein to mean a length of pipe that turns back on itself, so that fluids travelling within the pipe turn more than 90°. A layer of pipe is defined herein to mean a set of pipes that are spaced laterally from each other and that occupy a band whose thickness is approximately equal to the diameter of one of the pipes. In operation, a layer may be horizontal, vertical or at any angle there between.

It is understood that the material employed to make the continuous pipe used in practicing the invention will be ductile and not brittle at operational fluid transport pressures and temperatures, and that the material is impervious to gas stored within the continuous pipe. It will also be understood that while very long lengths of pipe are ideal, it may be necessary to make intermediate connections, such as by inline (i.e. butt, bias, etc.) welded connections, between the ends of long pipe sections to facilitate manufacturing. The continuous pipe may be fabricated from any normal grade of steel, for example X70, but the pipe steel may also be quenched and tempered for increased strength after all welding is complete.

While previous gas storage structures are known, the structures described herein have been developed for improved performance over those previously known.

Multiple gas storage structures 11 are shown in FIG. 1. Exemplary gas storage structures 11 are shown in more detail in the later FIG.s.

Figure 2:
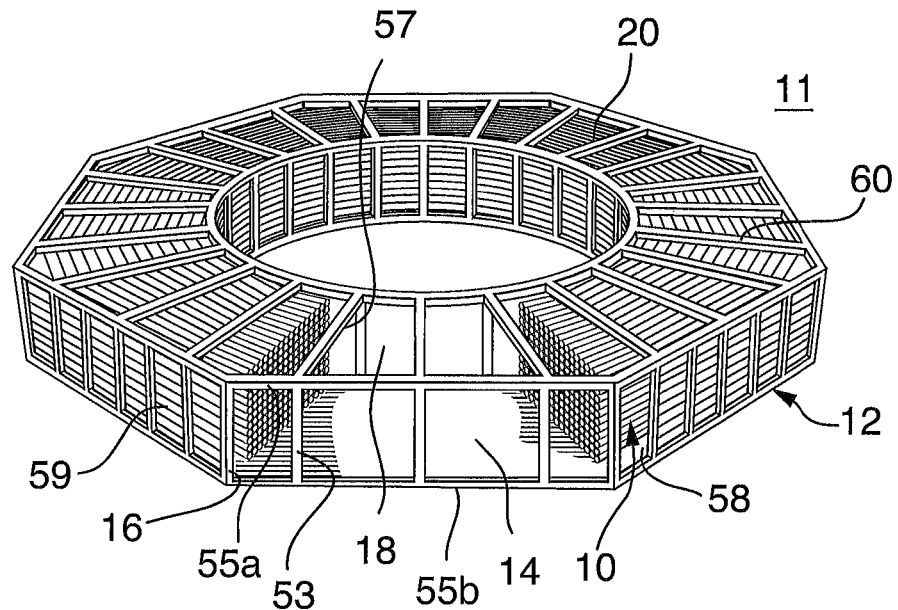
FIG. 2 is a perspective view, partly cut away and in section, showing continuous pipe wound in a container according to an embodiment of the invention.
Figure 5A:
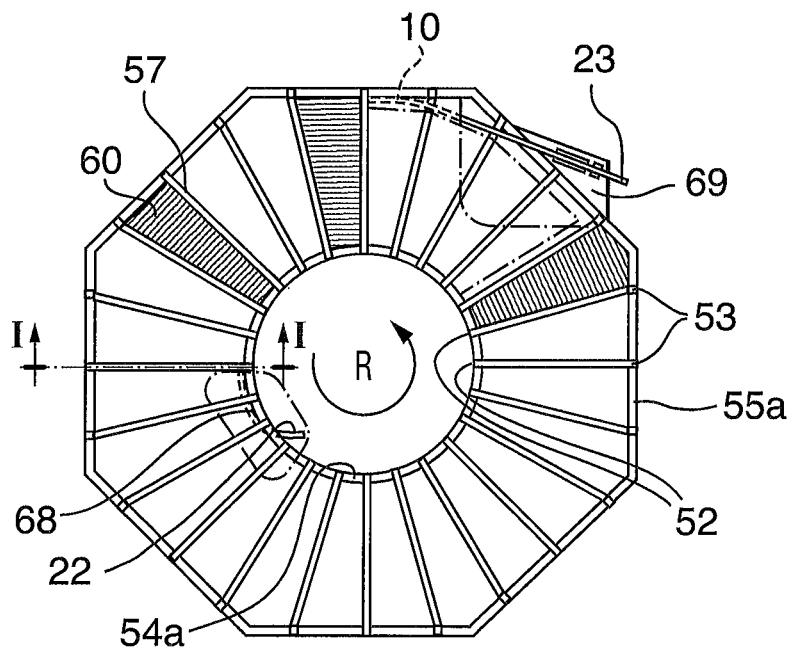
FIG. 5A is a plan view of the bottom of a container in accordance with one embodiment of the invention.

With reference to FIG. 2, a gas storage structure 11 of the present invention is made by distributing or coiling a continuous pipe 10 within a container 12. Pipe 10 is coiled in plural layers, each layer being formed of plural loops of the pipe. The gas is stored in the continuous pipe 10. Any openings in the continuous pipe 10 that allow flow of gas into or out of the pipe 10, such as at one or both ends of the pipe are provided with valves, for example, valves 21 in FIG. 1. The valves allow the continuous pipe 10 to be sealed for the storage and transportation of gas.

The container 12 has a base 14, an outer storage side wall 16, an inner storage side wall 18 and a top 20. In this illustrated embodiment, the container is shaped in the form of a spool (i.e. a reel) and the inner side wall 18 forms a central, substantially cylindrical core (or hub) with the base and the top forming the end flanges connected at the ends of the inner side wall 18. The base and the top extend radially outwardly from the inner side wall. The base and the top extend substantially parallel to each other. The container 12 thus provides a support into which the continuous pipe 10 may be wound, with the pipe wound around the core formed by the inner side wall 18 between the base and the top 20.

Figure 3:
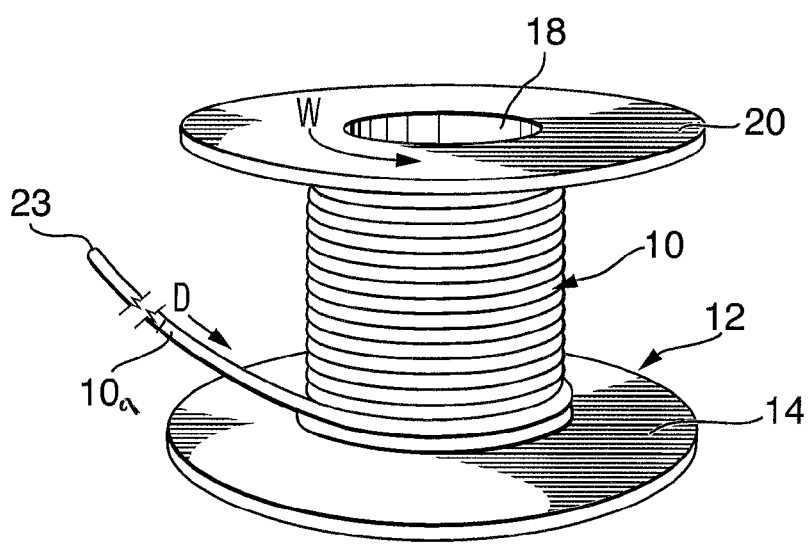
FIG. 3 is a schematic view of one winding arrangement of a continuous pipe.

The continuous pipe 10 may be coiled in the container 12 in a plurality of layers, each layer including a plurality of loops or wraps around the core formed by inner side wall 18. The pipe may be wound around the inner side wall 18 and thus the base 14, the inner wall 18 and the outer walls 16 support the continuous pipe 10. FIG. 3 shows a simple illustration of a possible coiling arrangement, wherein winding proceeds with the pipe wrapped in a first layer around the core and then in a second layer overlying the first layer. As shown here, further layers are wrapped around underlying layers of pipe that are already wound around the core formed by inner side wall 18. The pipe is wound, for example using a pipe tensioner, back and forth between the base 14 and the top 20. This type of winding is often called "reel-type" winding or "hose reel coiling".

In this manner, the continuous pipe 10 is installed in the container 12 by winding the pipe around the central core defined by the inner wall 18, beginning with a first end of the pipe positioned at the inside and ending with an opposite end 23 of the continuous pipe terminated at the outside. Many layers of continuous pipe 10 may be wound on the core. Ultimately, the last coil, terminating at end 23 may be selected to be adjacent base 14 or top 20 to maximize the amount of pipe wound in the container and possibly to be adjacent a convenient terminating site for connection to external piping, etc. In one embodiment, the last coil is wound such that end 23 is positioned on a low side such that end 23 can rest directly on base 14 for support.

Gravity causes the weight of upper wraps of pipe 10 to bear down onto the wraps of pipe therebelow (according to gravity), but a pipe may be used that is not adversely affected by such loading. Appropriate pipe can be identified readily from pipe strength calculations. As an example of the scale of the structure, a 6 inch outside diameter pipe may be wound in a container with a large outer diameter such as for example, 40 feet, a diameter across wall 18 of 10 feet and a height from the base to the top of about 10 feet. Such a structure may contain a length of continuous pipe in the order of 9 miles. Pipe outside diameters of between 1 inch and 10 inches are most useful.

Figure 4:
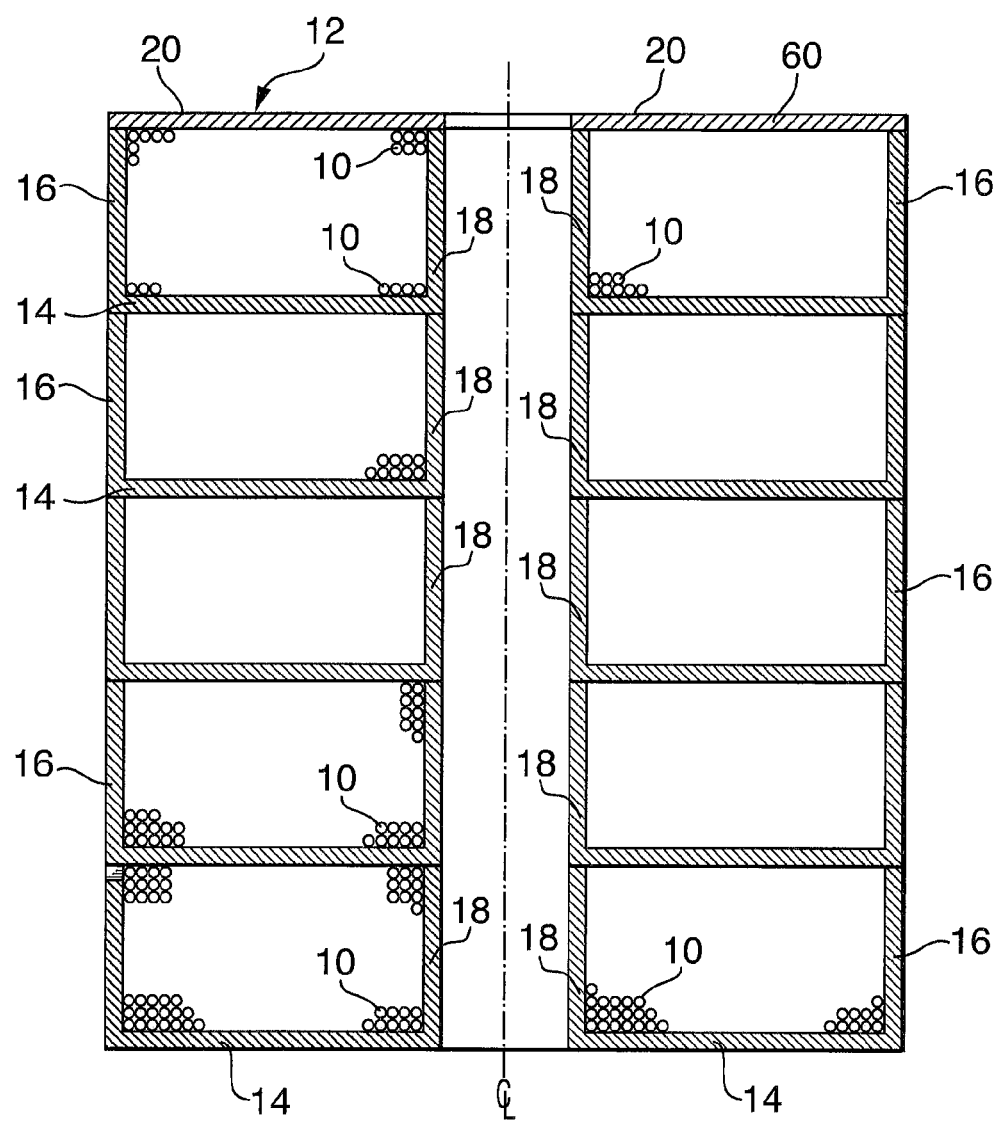
FIG. 4 is a cross-section through five spool containers stacked upon each other with continuous pipe wound around each spool (not all the pipes are shown)
Figure 5B:
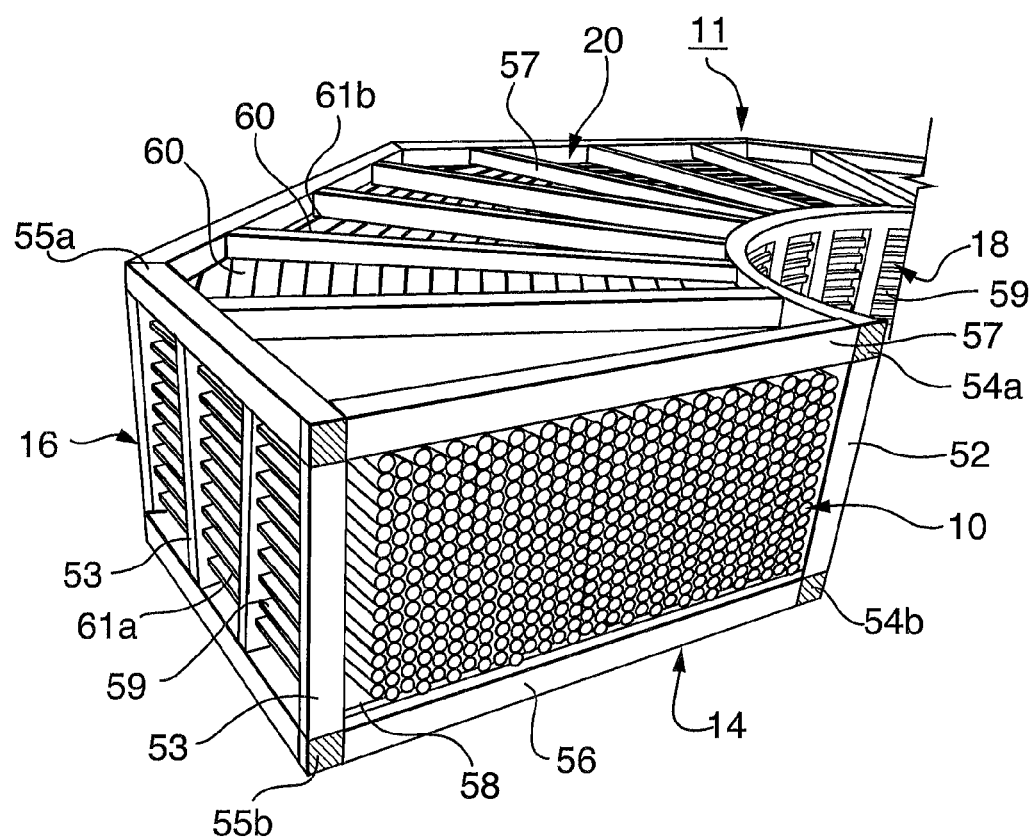
FIG. 5B is a section through the container of FIG. 5A along line I-I.
Figure 6A:
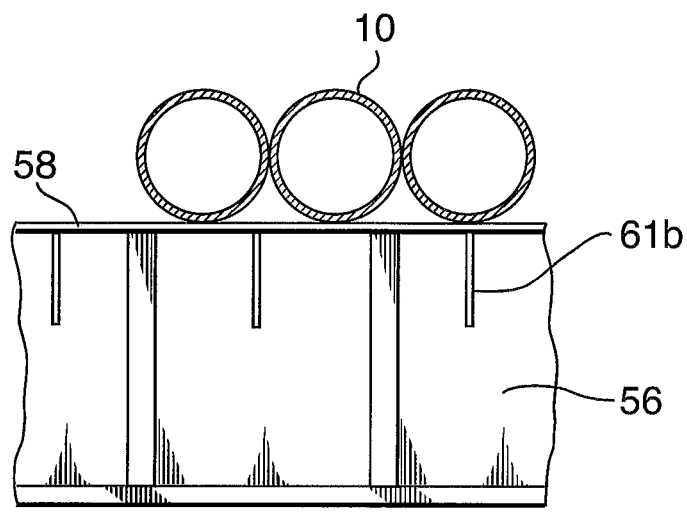
FIG. 6A is a radial section through the base of a container.
Figure 6B:
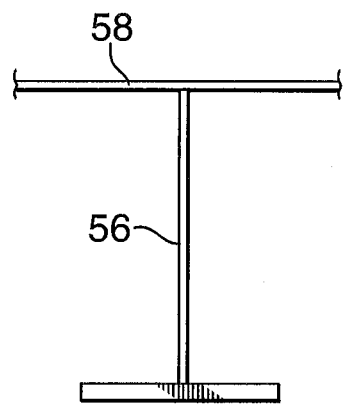
FIG. 6B is a section through the base of a container perpendicular to the section of FIG. 6A.
Figure 6C:
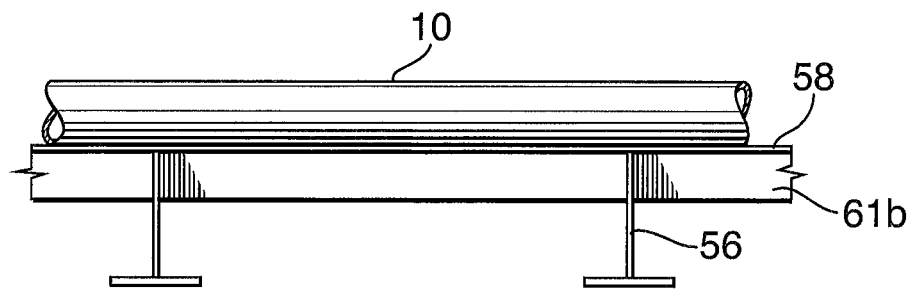
FIG. 6C is a radial view of the base of the container.
Figure 7:
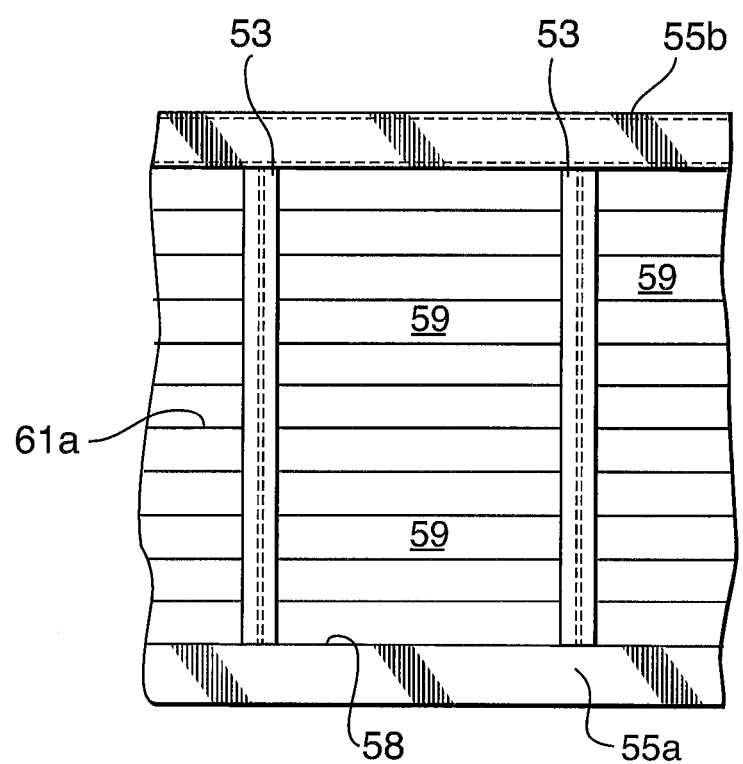
FIG. 7 is a side elevation view of a sidewall of the container of FIG. 5B.

In use on or in a carrier, the containers 12 are often stacked. For example, a stack of five containers 12 stacked is illustrated in FIG. 4. In such a stack, walls 16, 18 of the containers may support the weight of any structures above them. The containers 12 may be constructed in any of various ways, so long as they are capable of (i) supporting and containing the continuous pipe 10 and (ii) providing an airtight atmosphere around the pipe. Container 12 can also be formed to be lifted, thus making the pipe easier to handle and load, for example onto a carrier such as a ship.

As further illustrated in FIGS. 5A to 7, the container's side walls may include columns. For example, side wall 18 may be formed of columns 52 and side wall 16 may be formed of columns 53 on the outside. The base 14 of the container 12 also includes beams 56. The beams 56 may be radially oriented, for example, connecting radially aligned ones of the inner columns 52 and the outer columns 53. The top 20 of the container may also include beams 57, which may extend between inner and outer columns 52, 53. Columns 52, 53 and beams 56, 57 may take various forms such for example I-beams, box beams, laminates, etc.

Columns 52 may be connected at their ends with ring beams 54a, 54b and columns 53 may be connected at their ends with ring beams 55a, 55b. The shape of the container can be varied to serve one or more purposes. An inner wall 18 formed as a cylinder with a circular cross-section facilitates accommodation of the wound pipe coil 10. The circular, cylindrical inner wall inwardly supports the pipe coil 10 with substantially constant support of the pipe by the inner wall. This is compared to an angular inner wall, where there may be localized pressure points where the pipe bears against angular portions (i.e. the corners) of the inner wall.

The outer wall may also be circular and cylindrical. However, in one embodiment, outer wall 16, by formation of beams 55a, 55b and placement of columns 53, is formed as an angular cylindrical shape such that the container is formed as a polygon in plan view. For example, with reference to FIG. 5A, outer wall 16 may be shaped as a octagon in plan view such that the container has an exterior three dimensional shape that may be defined as an octagonal prism. The exterior polygonal wall for structure 11 has been found to facilitate construction and installation.

The base 14, side walls 16 and 18 and top 20 of the container 12 are preferably sealed so as to be air tight. This air tight seal provides the container 12 with a storage function in relation to fluids carried by the continuous pipe 10 or the container 12 or both. For example, while the pipe 10, which is intended to contain the gas to be transported, is arranged inside the container, the air tight construction of the container walls permits the container to be filled about the pipe with a dry inert gas such as nitrogen.

The container may be configured to contain gas leaks should it occur from pipe 10. It is believed that if a leak ever develops in the continuous pipe 10, the leak will initially be small. Once detected, the affected coil of the continuous pipe 10 can be promptly emptied and the leak repaired. Should the leak grow rapidly to a significant size, the pressure will rise inside the container 12. The walls of the container 12, for example, can withstand significant over pressure conditions without failure. Alternately or in addition, the walls of the container may be provided with collapsible panels, set to open before the pressure inside the container 12 reaches a level where it might damage some other part of the walls of the container 12. The gas flow from such a rapid leak can be conducted away by ventilation ducts 17 and vented via a vent stack of approved height. Ducts 17 may have valves therein to maintain the container airtight except if an over pressure condition occurs. It is believed that such double storage of pressurized gas, wherein the gas is stored in pipe 10 while the pipe is contained in an airtight container 12, will be recognized be regulatory agencies as exceedingly safe so that lower values for the safety factor of the pipe relative to bursting may be used with regulatory approval.

In one embodiment, for example, pipe 10 is selected to accommodate gas at pressures up to 8000 psi but normally will store gas at between about 2000 to 4000 psi. The container 12 is formed to be airtight but releases pressure through lines and ducts 17 should pressures exceed about 25 psi.

In one embodiment, for example, the walls 16, 18 and base 14 may include plates 58, 59 sealed so as to be impervious to leakage of fluid from the container through those walls.

The container 12 may also include top panels 60 sealed during operation. However, if the containers are intended to be installed in a stack as shown in FIG. 4, the top seal of a lower container in the stack may be provided by the base 14, including the beams and plates 58, of the container above, with only the upper most container having top panels 60 installed. Regardless, the top seal, however formed, completes the fluid tight enclosure for the container.

Plates 58, 59, 60 may include various forms of stiffening ribs 61a, 61b to improve their pressure holding capability and strength.

As noted, using reel-type winding, one end 22 of pipe 10 is positioned adjacent the inner wall 18, where winding starts and the opposite end 23 is positioned adjacent the outer walls 16, where winding ends. Various improvements have been proposed for the continuous pipe 10 of the gas storage structure. For example, ends 22, 23 may both be connected to external pipes or one or the other of the ends may be closed. End 23 also, being the free end of a wound length of continuous pipe 10, may have an amount of energy therein to cause the pipe to unwind. Also, if the container 12 is intended to be air tight, the exit points of ends 22, 23 through the walls from the container 12 may require adaptation to avoid leaks at these points.

In one embodiment, for example, only one end of the continuous pipe 10 is open for loading and unloading of gas. For example, in the illustrated embodiment only end 23 adjacent outer wall 16 is connected for loading and unloading of gas. Thus, end 23 is connected to external pipe 66 and a valve 21 is positioned to control inflow and outflow through end 23 and pipe 66 to/from manifold pipes 67.

End 22 adjacent inner wall 18 may be constricted so that gas loading and unloading cannot readily occur therethrough. End 22 for example, includes a capped end 70. In one embodiment, end 22 can be completely closed. In the illustrated embodiment, however, capped end 70 includes a connection such as a nipple for accepting a flush line 72, having a diameter much smaller than that of pipe 10. Flush line 72 may be connected onto capped end 70 to therethrough permit fluid flushing of pipe 10. Flush line 72 may include a valve 74 to control fluid flow therethrough. While valve 74 is shown close to end 70, the valve may in actuality be some distance from the end of pipe 10. Flush line 72 may be connected to a flush system for the gas storage structures of the carrier.

As another example, the continuous pipe 10 may be installed in the container to better accommodate expansion and contraction of the pipe. For example, the pipe may expand when the pressure or temperature of the gas in the pipe is increased and the pipe may contract or relax as the gas is unloaded or the temperature is reduced. To better accommodate expansion and contraction, only the ends 22, 23 of pipe 10 are connected to the container, while the intermediate length 10a between the ends of the continuous pipe 10 remains free of any rigid connection to the container. This ensures that the intermediate length between the ends is free of any rigid for example fixed connections such as clamps or especially welded connections. Fixed connections do not, of course, include simple contact with the container, which contact will occur between the intermediate length at certain points and the container. Being free of rigid connections to the container, pipe 10 as a whole is mostly free to expand, such as when the pipe is pressured up with gas and pipe 10 is mostly free to contract when the pipe is emptied, without causing localized stress in the pipe. In so doing, points of rigid connection between the pipe and the container, which can generate considerable stresses and which can become points for failure, are minimized. The gas storage structure can include a rigid connection 68 between first end 22 of the continuous coiled pipe 10 and the container 12 and another rigid connection 69 between opposite end 23 and the container 12, while the intermediate length 10a of pipe between the first end and the opposite end is free of any rigid and fixed, such as welded, connection to the container. The intermediate length of pipe is therefore free to slide and move, for example, the coils can slide relative to one another and the coils can settle and shift free of rigid connections to other coils and free of rigid connections to the container.

Figure 10:
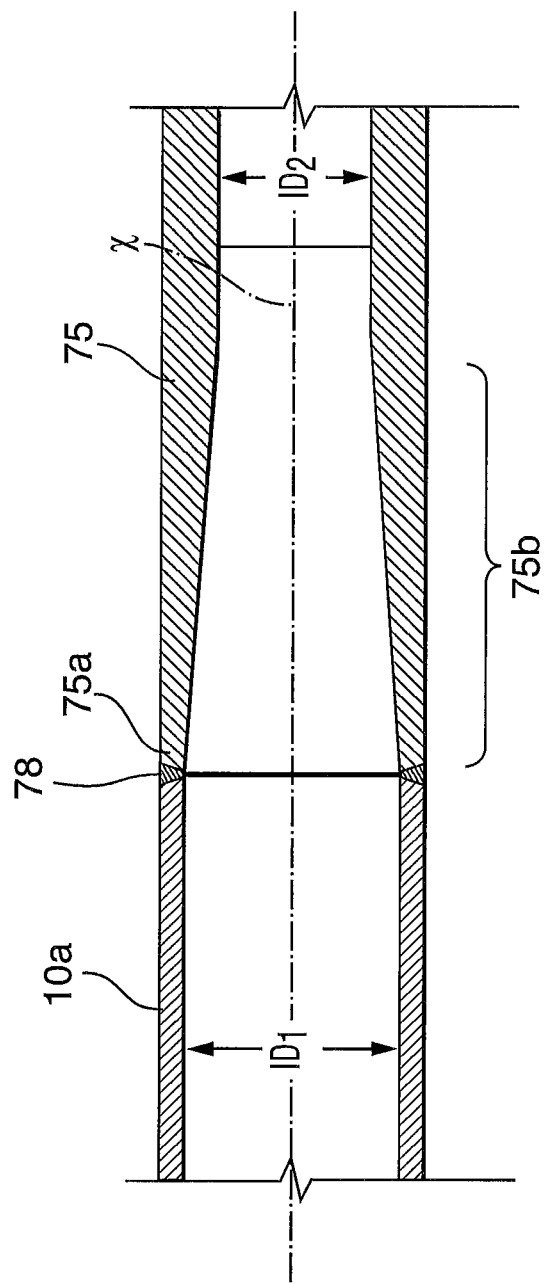
FIG. 10 is a section along a long axis of the pipes joined at a joint between a thick walled pipe and a thin walled pipe.

To further minimize pipe failure while accommodating expansion and contraction of the coil and while accommodating the force in the coiled pipe urging it to unwind, the ends 22, 23 may be reinforced. Since the pipe that is suitable for coiling may be relatively thin walled, it sometimes is unable to withstand the stresses of expansion and contraction while being secured to the container. Thus, in one embodiment, the pipe includes a reinforced end pipe 75, 76 connected at each end of intermediate length 10a. For example, ends 22, 23 are each reinforced by joining a thicker walled pipe to the thin walled pipe used for intermediate portion 10a of the pipe between the ends. For example, pipes 75, 76 may be employed at ends 22, 23, respectively, that have thicker walls than the intermediate length of pipe 10a. Pipes 75, 76 may be joined, as by fusion, welding, connectors, etc., at respective fluid tight joints 78, 79 to the intermediate pipe 10a at its ends, so that the inner diameters of the pipe 10 and pipes 75, 76 are all substantially aligned and in communication. Welding such as butt welding has been found to provide a reliable joint. In one embodiment, as shown at FIG. 10, pipe 75 may be joined, as by butt welding at welded joint 78, to pipe 10a. This places inner diameter ID1 of pipe 10a in communication with the inner diameter ID2 of pipe 75. The pipes may be joined in substantial axial alignment so that the long axis x of the pipe is consistent through the joined pipes. Pipe 75 is a thicker walled pipe than pipe 10a. For example, the wall thickness of pipe 75 may be 1.5 to 3 times more than the wall thickness of pipe 10a, The wall of pipe 75 may be formed to taper in thickness toward its joined end 75a to avoid the formation of an abrupt step at the joint 78. Tapering may be gradual. For example, the slope may be between 1:3 to 1:10. While the tapered length 75b in FIG. 10 is shown on the inner wall of pipe 75, the tapering may be along the outer surface if desired. After the pipes 10a, 75 are welded, the welds may be ground to reduce outer surface protrusions.

Pipes 75, 76 have a wall thickness that accommodates the connection of the pipe to the container at connections 68, 69. For example, pipes 75, 76, being thicker walled than the coiled pipe 10a, are better able to accommodate connection stresses and welding without failure. In one embodiment, rigid connections such as welds at connections 68, 69 between pipe 10 and the container 12 may be placed only between the thick walled pipes 75, 76 and the container.

Figure 8A:
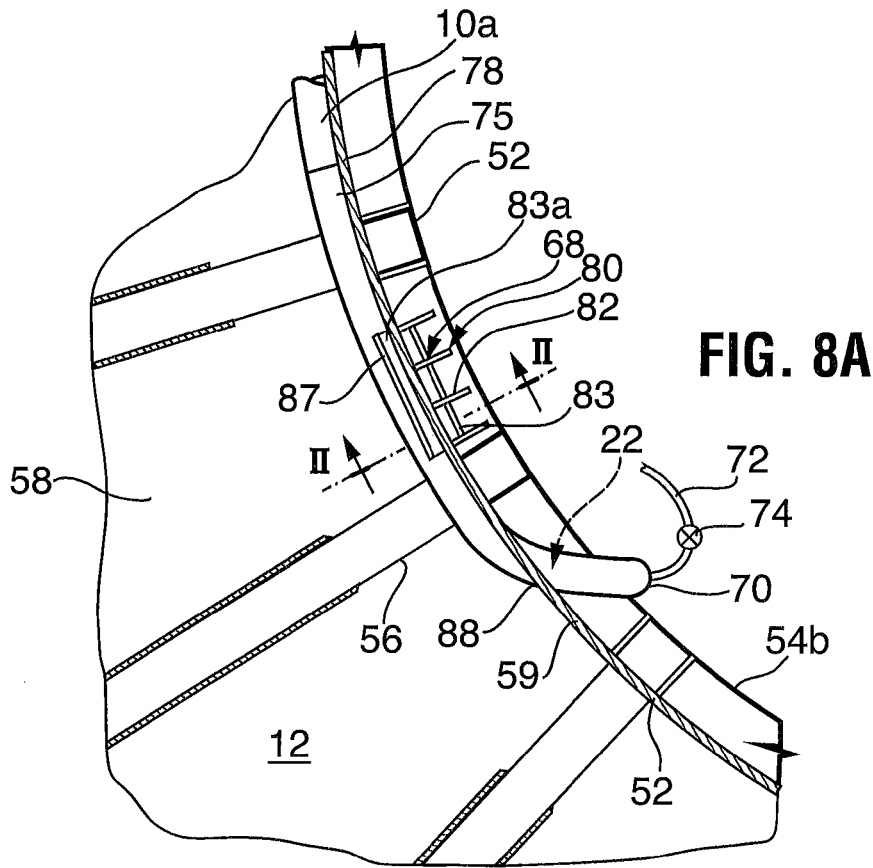
FIG. 8A is a top plan view of a connection between the continuous pipe and the container.
Figure 8B:
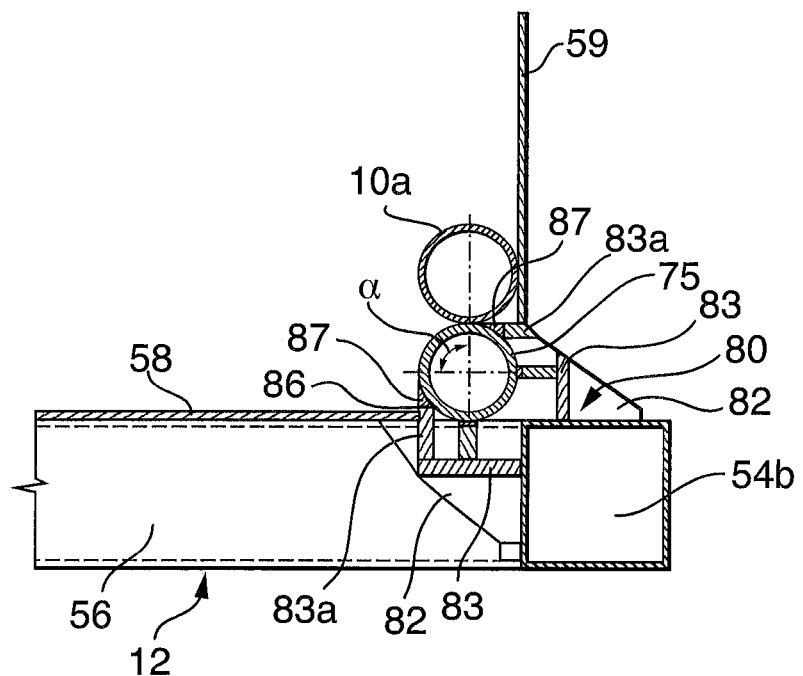
FIG. 8B is a section along line II-II in FIG. 8A showing an additional turn of pipe alongside a pipe connection.

In one embodiment, such as is illustrated at connection 68 for example in FIGS. 8A and 8B, a welded connection is employed to secure the pipe at end 22 to container 12. In this illustrated embodiment, a bracket 80 is installed on container 12. For example, bracket 80 may include struts 82 and long reinforcements 83 connected at one end to one or more of the container's structural beams or columns such as lower ring beam 54b. Struts 82 and reinforcements 83 form a pipe support area 86 at the other end. Pipe 75 may be connected at pipe support area 86, for example, via welds 87.

Panels 58, 59 may be sealed against bracket 80 to ensure the air tight characteristic of container 12. If end 22 is connected to a flush line 72, as shown, or other pipe, pipe 75 or the flush line may pass through an opening in panel 59 and the interface between the panel and the pipe or line may be sealed, as at seal 88, again to ensure that the container remains air tight. In such an embodiment, it may be useful to extend pipe 75 through panel 59 as the thick wall of the pipe can readily accept a weld to form seal 88.

Bracket 80 may extend along ring beam 54b and may form pipe support area 86 in the corner of base 14 and wall 18. Pipe support area 86 may be formed to follow the curvature of wall 18. Thus, connection of pipe 75 in pipe support area 86 places pipe 75 also in the corner of base 14 and wall 18. Pipe 75 is therefore positioned to form a portion of the first coil around wall 18. Pipe 75 can be bent to fit into area 86 and to also follow the curvature of wall 18. Pipe 75 is well supported to minimize stress on the connection due to the positioning of pipe 75 in the corner between base 14 and wall 18 and with the corresponding curvature of pipe 75 relative to wall 18. The curvature of pipe 75 can be maintained along its length between bracket 80 and joint 78 such that the joint also is well supported, positioned at the corner and supported against wall 18. Thus, joint 78 tends to feel only forces along its axis x rather than lateral forces.

Pipe 75 may be relatively short, for example, spanning less than 25%, or possibly less than 10%, of the circumference of wall 18. As such, intermediate pipe 10a, which extends on the other side of joint 78 and which is thin walled and more flexible, can be wrapped around wall 18 to complete the first loop of pipe after connection joint 78. Pipe 75 may have an outer diameter substantially similar to pipe 10a such that the pipes 75, 10a wrap together uniformly with the long axis of pipe 10a in parallel to the axis x through joint 78. In particular, the pipe 75 may accommodate substantially the same area as other wraps of pipe 10a in the container such that adjacent wraps of pipe, for example those wraps alongside (as shown by pipe 10a in FIG. 8B) or over top, lay in parallel alongside the pipe 75 as well as through joint 78.

Bracket 80 connects pipe 75 to container 12, and it can be formed to ensure a close and uniform wrapping of pipe 10 in the container. For example, bracket 80 can be formed to be retracted from interference with the wrapping of pipes. For example, struts 82 and long reinforcements 83 extend between the pipe 75 and the adjacent wall and base structures without protruding to increase the effective diameter of the pipe around its exposed outer surface through an angle α of at least about 90°. To achieve this, for example, the bracket structures, such as long reinforcements 83a, are positioned to extend no more than perpendicularly from the adjacent wall surface and have surfaces connecting to pipe 75 generally along a tangent of the pipe outer surface where it is to contact an adjacent wrap of pipe 10a. As such, the bracket does not prevent a close wrapping of pipe 10a alongside or onto pipe 75.

Figure 9A:
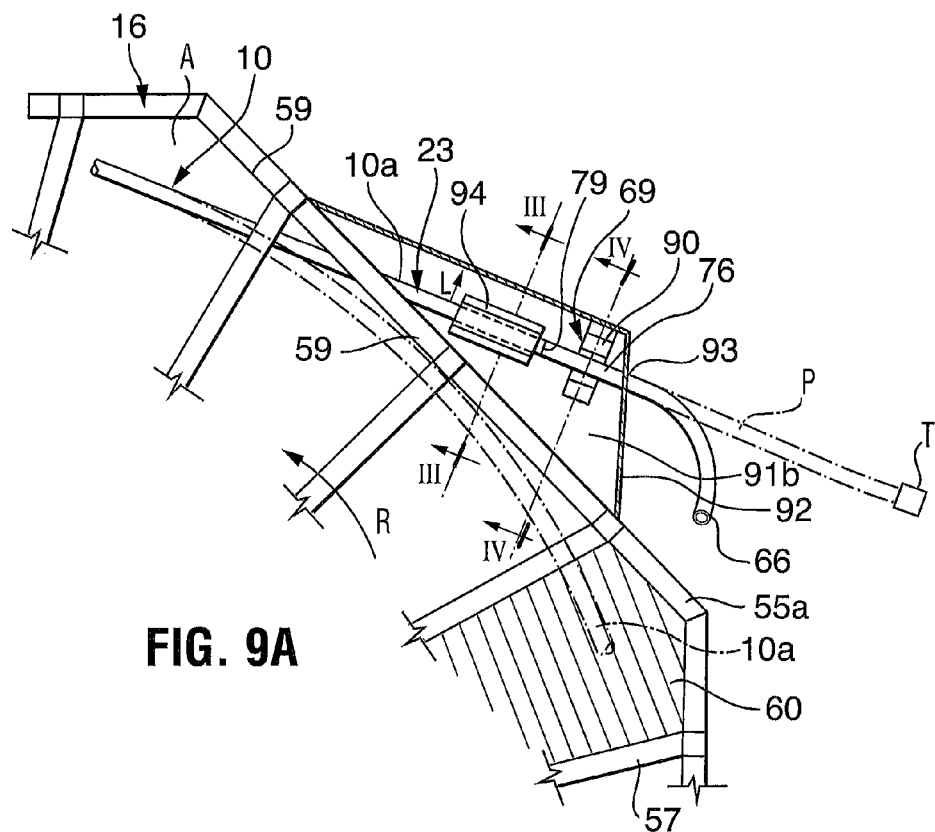
FIG. 9A is a top plan view of another connection between the continuous pipe and the container.
Figure 9B:
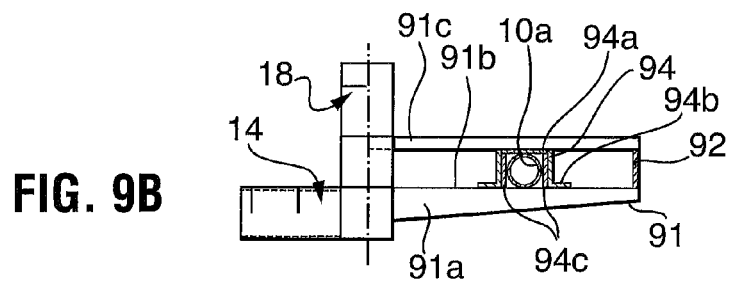
FIG. 9B is a section along line in FIG. 9A.
Figure 9C:
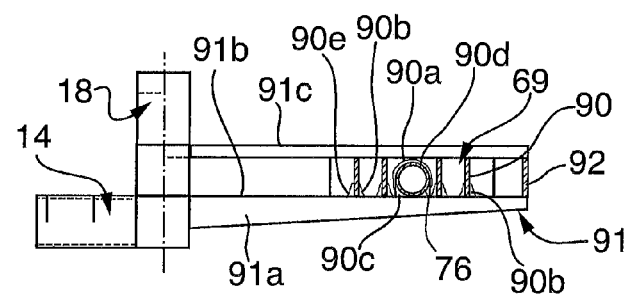
FIG. 9C is a section along line IV-IV in FIG. 9A.

Connection 69 between continuous pipe 10 and container 12 illustrates another connection that facilitates manufacture and offers good performance and durability for the gas storage structure. With reference to FIGS. 9A to 9C, connection 69 secures the continuous pipe against the force urging the pipe to unwind and stabilizes the connection against the forces inherent in the connection to external pipe 66.

Connection 69 includes a connector 90 that engages the pipe directly and maintains the pipe from releasing the energy in the reel of pipe, which would cause it to move radially outwardly and to, thereby, unwind.

As noted above, at connection 69, thick walled pipe 76 may be connected to the intermediate length 10a of pipe at joint 79. Connector 90 engages thick walled pipe 76 and connector 90 is secured to container 12.

Connector 90 may be formed as a strap with a pipe-overlying strap portion 90a and fastening anchoring portions 90b. Strap portion 90a extends to define an opening 90c sized to accommodate the outer diameter of pipe 76. Connector 90 is durably secured between pipe 76 and container 12. For example, connector 90 may be secured to the pipe via welds 90*d* between opening 90*c* and the outer surface of pipe 76 and welds 90*e* may also secure connector 90 to container 12.

Connector 90 secures pipe 76 against (i) axial movement, (ii) lifting and (iii) lateral movement. As will be understood better with reference to the following disclosure, connector 90 primarily acts to secure pipe 76 against movement along the pipe's long axis. Loading and unloading of gas tends to cause the pipe to move axially (i.e. axial pull/push relative to connector 90) and connector 90 resists this movement.

As illustrated, strap portion 90*a* of connector 90 may actually be formed by one or more webs, two are shown, secured to a plurality of fastening portions 90*b* formed as upstanding, walls substantially axially aligned with the long axis of pipe 76. Strap portions 90*a* are the only parts to which pipe 76 is welded for simplicity and durability.

Connector 90 may be positioned to secure pipe 76 in the path P along which the continuous pipe 10 extends between the reel and the pipe tensioner T after the winding of the last coil of pipe. Thus, the pipe need not be redirected to complete connection 69.

Connector 90 can be secured at various positions on container 12. For example, connector 90 may be positioned inwardly of wall 16 for example in space A. However, if more space is needed, to facilitate connection to external piping or to facilitate access for inspection or repair, connection 69 may be positioned on an extension of the container, for example on a platform 91 extending from base 14 outwardly from wall 16. Platform 91 may include a lower support frame 91*a* defining or supporting a support surface 91*b* and an upper frame 91*c*. Support surface 91*b* extends generally on the same plane as panels 58 so that the pipe can be fully supported and can maintain its alignment along path P.

While pipe 10 must extend through wall 16 for connection to external piping 66, care should be taken to ensure that the airtight character of the container is maintained. As such, seals should be positioned between pipe 10 and the container wall where the pipe passes out of the airtight container. While this can be achieved at various locations, the seal may be best made between the thick walled pipe and the container, as reliable sealing methods, such as welding, may be employed without causing problematic damage to the pipe, as may happen if welds were to be made against the thin walled intermediate pipe 10*a*. Additionally, if the seal is made adjacent the strap, the pipe may be restrained such that vibrational movement does not weaken the seal. Thus, in one embodiment, platform 91 is enclosed by an enclosure 92 that renders the chamber therewithin, which is around connector 90, airtight. The enclosure 92 can include plates forming surface 91*b* and plates over upper frame 91*c* and may be completed by a seal 93 around pipe 76, between enclosure 92 and pipe 76. The seal 93 may, for example, be a weld since welding provides a reliable and strong seal. Pipe 76 is thick walled and selected to accommodate the weld. The connector 90 may be positioned between seal 93 and the reel of pipe 10*a* so that the pipe 76 on which seal 93 placed is held quite stable.

Pipe 76 may extend to form, or be connected to, external piping 66.

Connection 69 may further include a retainer 94 to stabilize the pipe as it emerges from the wound arrangement of pipe coils on the reel. Retainer 94 may be close to the pipe coil, positioned for example between the pipe coil and the connector 90 and may, therefore, be the first holding structure between container 12 and pipe 10 to hold the pipe in place after winding, possibly without physical engagement of the pipe thereby to mitigate damage thereto. For example, retainer 94 may be a strap-type member including a top overlying strap 94*a* and connector legs such as side angles with tabs 94*b*. Top strap 94*a* is sized to accommodate and fit over the outer diameter of the pipe to be secured. Fastening tabs 94*b* secure strap 94*a* to the container 12. Tabs 94*b* may be secured to the container by durable means such as fasteners or welding. Strap 94*a* may be formed to avoid damaging the pipe and avoid making a rigid connection to the strap. For example, the inner surfaces and side edges of strap 94*a* may be formed smooth and/or may be lined with a cushioning material 94*c* softer than steel such as an elastomeric material such as for example, of neoprene.

Retainer 94 may be positioned to secure the intermediate length of the pipe in the path P along which the pipe extends between the reel and the supply of pipe on pipe tensioner T after the winding of the last coil of pipe. It is desired that the pipe not be redirected to complete connection 69. In fact, the retainer 94 may be placed while the pipe remains extending between the reel and the pipe tensioner after the winding of the last coil of pipe and before cutting the pipe.

The retainer 94 may provide the first stabilizer and positioning member between the pipe and the container, after the pipe comes off the reel and, if so, retainer 94 should be formed to withstand a significant lateral load, especially in the direction along arrow L. Lateral load will be applied to retainer 94 as the energy in the reel of pipe causes the pipe to unwind. Tabs 94*b* should, therefore, be firmly secured.

Retainer 94 may, however, allow some pull back of the pipe as it relaxes, such as would likely result in movement along the long axis of the pipe relative to the container.

Retainer 94 may also take lateral stress off joint 79 and joint 79, therefore, may be formed to be positioned in retainer 94, for example under top strap, or in the space between connector 90 and retainer 94.

Retainer 94 may, therefore, be formed to retain thin walled pipe 10*a* without damage thereto and in such a case there may be no rigid connection such as direct, welded connection between the retainer and pipe 10*a*, but instead, retainer 94 simply holds the pipe in a position on the container. In particular, the connection at end 23 is free of a welded connection between container 12 and intermediate pipe 10*a*, which is thin walled.

In one embodiment, retainer 94 is used to hold the pipe still while joint 79 is made to connect pipe 76 and until connector 91 is installed.

The present gas storage structure can be manufactured by a method wherein the continuous pipe is connected at one end to the container, the continuous pipe is wrapped around the inner wall 18 and then the continuous pipe is connected at its terminus to the container. In one embodiment, the continuous pipe includes a thick walled first end, a thick walled opposite end and an intermediate length connected between the first and opposite ends, the intermediate length having walls thinner than the thick walled pipes. The thick walled pipes are connected to the container, while the intermediate length is not connected by welds, and may not be connected in any rigid way, to the container. In the gas storage structure, the major portion of the continuous pipe is the intermediate length.

In one method, a container is used that is formed as a spool with end walls and an inner wall forming a core between the end walls. If the container is employed with the axis of the core oriented vertically, the end walls may be considered a base and a top.

A length of thick walled pipe is joined, as by welding for example by butt welding, to the first end of the intermediate pipe. The thick Walled pipe is connected via a connection to the inner wall of the container. The connection may be by welding. In one embodiment, the thick walled pipe is connected at a corner adjacent the inner wall, which is between the inner wall and one of the end walls. In one embodiment, the thick walled pipe is connected at the corner between the inner wall and the base.

In one embodiment, the thick walled pipe has a curve along its length that substantially matches a curvature along the inner wall and the thick walled pipe is connected to the inner wall with the curve extending to substantially follow the curvature of the inner wall. In one embodiment, connecting the thick walled pipe in the container places the joint between the thick walled pipe and the intermediate pipe in a supported position in the corner adjacent the inner wall. The thick walled pipe may be bent before connecting and the joint may be formed before connecting.

The intermediate pipe is then wound around the inner wall with a first wrap alongside the thick walled pipe from the corner towards the opposite one of end walls, this being known as hose reel coiling. The intermediate pipe can be wrapped alongside the thick pipe directly touching both the outer surface of the thick walled pipe and the outer surface of the intermediate pipe at the joint.

Winding of the intermediate pipe continues back and forth between the end walls (i.e. the base and the top), with further layers of intermediate pipe wound over underlying layers until the container is sufficiently filled with a reel of continuous pipe, the major portion of which is the intermediate pipe. The winding may be achieved by moving the intermediate pipe along a path P between a supply of the continuous pipe and the container. This may include turning the container, for example as shown by arrows R of FIGS. 5A and 9A, to pull pipe from a pipe tensioner T. The pipe is pulled along a path from the pipe tensioner to the container. It will be appreciated that the path will move as the container is filled with pipe, but one path P is shown in FIG. 9A, that path being the final path for that reel.

After winding the intermediate pipe, the pipe is connected to the container. To do so, a thick walled terminal pipe may be joined to the end of the intermediate pipe. A joint between them may be formed by welding, for example, butt welding. The thick walled pipe is connected via a rigid connection to the container. The rigid connection may be by welding. In one embodiment, the rigid connection is made such that the pipe remains substantially aligned along the path between the reel and the tensioner, such that the pipe need not be redirected or bent to make or remain in the rigid connection. In one embodiment, the last wind brings the intermediate pipe alongside the base or the top and the connection is made to maintain the pipe in a plane parallel to the base, such that the pipe need not be redirected or bent.

In one embodiment, the pipe is first retained to stabilize it and then the rigid connection is made between the pipe and the container. In one embodiment, the first step of retaining the pipe secures the intermediate pipe especially against lateral movement and the rigid connection secures the thick walled terminal pipe. The first step of retaining may use means other than welding to secure the intermediate pipe, as welding may weaken or damage the intermediate pipe, which is thin walled. In one embodiment, retaining the pipe includes securing a strap over the intermediate pipe, which may include placing the strap over the pipe without welding between the strap and the pipe and securing the strap to the container. For example, this may include placing the pipe into the opening of a strap between the side angles and connecting the strap, for example the strap's legs, onto the container alongside the pipe. In one embodiment, the side angles and tabs of the strap are installed separately from the top of the strap, and the tabs and side angles are connected first to the container and then the top is secured to the side angles to hold the pipe from riding up out of the strap. The connection can be cushioned to prevent wear of the pipe against the strap, since wear may damage the thin-walled pipe.

The formation of the joint between the intermediate pipe and the thick walled pipe may be deferred until after the pipe is retained, such that the intermediate pipe is stabilized during formation of the joint between the intermediate pipe and the thick walled pipe. Then, the thick walled pipe may be rigidly connected to the container.

When the intermediate pipe is cut, forces cause the pipe to move laterally, see arrow L. Installation of retainer 94 prevents this lateral movement and stabilizes the intermediate pipe. Retainer 94, which does not have a rigid connection to the intermediate pipe, may allow the intermediate pipe to be pulled back toward the reel to some degree. Because of this, the placement of the cut relative to the position of the retainer should allow for an amount of axial movement, for example pull back, without the pipe pulling fully out of the retainer. However, this pull back does not need to be restrained and, in fact, may be allowed as it releases some axial stresses in the intermediate pipe before the rigid connection is made.

The joint between the intermediate pipe and the terminal pipe may be (i) positioned within, for example under, the retainer, (ii) protected within the strap, or (iii) positioned between retainer 94 and connection 90 so that the joint remains stabilized, for example, against lateral loads.

The rigid connection 90 may be installed on a platform extending from the outer wall of the container. Thus, the method may include installing a platform on the container to accept the rigid connection to connector 90.

The method may include forming the container about the pipe reel air tight. This may include enclosing the pipe reel with an airtight enclosure. In one embodiment, this includes creating seals about any pipes passing out of the enclosure. This may be required at the first end, if either the thick walled pipe or the flush line protrudes from the enclosure. In another embodiment, enclosing the pipe reel may include installing an enclosure about the rigid connection 90. In one embodiment, installing an enclosure includes sealing about the terminal pipe where it protrudes from the enclosure, the seal being adjacent connection 90 and on the other side of connection 90 from the reel.

In one embodiment, the enclosure may be installed in stages to permit access for the connecting operations at the terminal end. For example, a portion of the platform between the intended location of the first connection and the outer edge of the platform may be installed after the joint is made, to ensure that access can be had to all sides of the intermediate pipe for formation of the joint.

The terminal thick walled pipe may be connected to external piping suitable for loading and unloading gas to the continuous pipe. This may include bending the terminal pipe.

Any safely transportable gas may be transported with the gas storage device of the invention, such as natural gas, and may for example, be in the form of a compressed or liquefied natural gas.

In a further embodiment, the storage device of the invention may be placed within a barge and moored close by a city together with a compressor and connected to a major gas supply pipeline to provide gas supply during hours of peak demand. During periods of low demand, the storage device may be replenished. The storage device could also be placed in a building on land or underground to provide a similar function, for example for the storage of natural gas for an electric power plant or town gas for a city. In smaller sizes, the storage device of the invention could be used to store compressed natural gas (CNG) in a CNG fuelling station for vehicles.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A gas storage structure comprising:
a container; and
a continuous coiled pipe supported by the container, the continuous coiled pipe including:
  a first end, an opposite end and an intermediate length of pipe between the first end and the opposite end, and wherein,
    the first end is formed of thick walled pipe, the thick walled pipe having a wall thickness thicker than the intermediate length of pipe, the thick walled pipe being welded to the container;
    the opposite end is formed of a second thick walled pipe, the second thick walled pipe having a wall thickness thicker than the intermediate length of pipe, the second thick walled pipe being welded at a welded connection to the container;
    the intermediate length of pipe is free of any rigid connection to the container, such that the intermediate length of pipe is free to expand and contract due to changes in internal pressure and temperature; and
    the second thick walled pipe being connected to the intermediate length of pipe by a welded joint and further comprising a retainer holding the intermediate length of pipe in a position on the container, the welded joint being positioned adjacent the retainer and between the welded connection and the retainer.

2. The gas storage structure of claim 1 wherein one of the first end and the opposite end is capped and the other of the first end and the opposite end is open for loading and unloading gas to the continuous coiled pipe.

3. The gas storage structure of claim 1, wherein the container is formed as a reel and the first end is connected to a core of the reel, the first end having a curvature along its length that substantially follows a circumferential surface curvature of the core.

4. The gas storage structure of claim 3, wherein the first thick walled pipe is welded in a corner between the core and a base of the reel and the intermediate length of pipe is wrapped around the core with wraps of the intermediate length of pipe positioned alongside and over the thick walled pipe.

5. The gas storage structure of claim 1 wherein the retainer is free of any welds to the intermediate pipe and includes a cushioning surface against which the intermediate length of pipe bears.

6. The gas storage structure of claim 1 wherein the container is a reel and the intermediate length of pipe is coiled about a central core of the reel in plural loops arranged in plural layers and the first end is connected to a core of the reel;
  the first end having a curvature along its length that substantially follows a circumferential surface curvature of the central core and the thick walled pipe of the first end is welded in a corner between the central core and a base of the reel and the intermediate length of pipe is wrapped around the core with wraps of the intermediate length of pipe positioned alongside and over the thick walled pipe; and
  the retainer is free of any welds to the intermediate length of pipe and includes a cushioning surface against which the intermediate length of pipe bears.

7. The gas storage structure of claim 6 wherein the thick walled pipe and the intermediate length of pipe have substantially similar outer diameters.

8. The gas storage structure of claim 7 wherein the second thick walled pipe is welded on a platform extending out from an outer polygonal wall of the container.

9. A method for manufacturing the gas storage structure of claim 1, the method comprising: welding the first end of the continuous pipe adjacent a central core of the container, which is reel-shaped; wrapping the first end and the intermediate length of the continuous pipe around the central core to arrange the continuous pipe in plural layers of plural wraps; and welding the opposite end of the continuous pipe to the container, wherein the intermediate length has a wall thickness thinner than a wall thickness of both the first end and the opposite end and the intermediate length is free of any rigid connections to the container to thereby enable the intermediate length to expand and contract due to changes in internal pressure and temperature.

10. The method of claim 9, further comprising after wrapping, welding the second thick walled pipe to an end of the intermediate length to form the opposite end.

11. The method of claim 9, wherein welding the first end includes welding the first end at a corner between the central core and an end wall of the reel-shaped container and wherein a joint between the first end and the intermediate length is in a supported position in the corner.

12. The method of claim 9, wherein wrapping includes arranging a first wrap of the intermediate length alongside the first end and wrapping includes hose reel coiling.

13. The method of claim 9, wherein the first end has a curved length that substantially matches a curvature about the central core and welding includes connecting the first end against the central core with the curved length extending to follow the curvature of the central core.

14. The method of claim 9, wherein wrapping includes pulling the intermediate length along a path from a supply of the intermediate length to the container and further comprising retaining the intermediate length in a position on the container before welding the opposite end to the container.

15. The method of claim 14 wherein retaining holds the intermediate length against lateral movement, while permitting movement along a long axis of the intermediate length relative to the container.

16. The method of claim 14 wherein after wrapping, an extending portion of the intermediate length extends from a final wrap toward the supply and the method further comprises: retaining the extending portion of the intermediate length with the retainer, formed as a strap to the container; cutting the extending portion between the supply and the strap such that the extending portion remains retained by the strap; connecting the opposite end to the extending portion; and welding the opposite end to the container to form the welded connection.

17. The method of claim 16 wherein connecting includes welding the extending portion to the opposite end, thereby forming the welded joint, the welded joint being positioned between the strap and the welded connection.

18. The method of claim 17 further comprising enclosing the container with an airtight enclosure with a portion of the opposite end protruding from the airtight enclosure and the welded joint positioned within the airtight enclosure.

19. A gas storage structure comprising:
  a container formed as a reel with a core, the core having a circumferential surface curvature and the core extending from a base of the reel; and
  a continuous coiled pipe supported by the container, the continuous coiled pipe including:
    a first end, an opposite end and an intermediate length of pipe between the first end and the opposite end, and wherein,
      the first end is formed of thick walled pipe, the thick walled pipe having a wall thickness thicker than the intermediate length of pipe, the thick walled pipe being welded to the container, the first end being connected to the core of the reel and having a curvature along a length that substantially follows the circumferential surface curvature of the core;
      the opposite end is formed of a second thick walled pipe, the second thick walled pipe having a wall thickness thicker than the intermediate length of pipe, the second thick walled pipe being welded at a welded connection to the container;
      the intermediate length of pipe is free of any rigid connection to the container, such that the intermediate length of pipe is free to expand and contract due to changes in internal pressure and temperature; and
      the thick walled pipe is welded in a corner between the core and the base of the reel and the intermediate length of pipe is wrapped around the core with wraps of the intermediate length of pipe positioned alongside and over the thick walled pipe.

* * * * *